United States Patent
Schwegler et al.

(10) Patent No.: US 11,022,218 B2
(45) Date of Patent: Jun. 1, 2021

(54) PARKING INTERLOCK IN A VEHICULAR TRANSMISSION

(71) Applicant: ZF Friedrichshafen AG, Friedrichshafen (DE)

(72) Inventors: Thomas Schwegler, Tettnang (DE); Florian Weinl, Bodolz (DE); Michael Jud, Maikammer (DE); Armin Haugg, Friedrichshafen (DE); Julia Klein, Friedrichshafen (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 101 days.

(21) Appl. No.: 16/289,720

(22) Filed: Mar. 1, 2019

(65) Prior Publication Data

US 2019/0271395 A1    Sep. 5, 2019

(30) Foreign Application Priority Data

Mar. 2, 2018   (DE) ..................... 10 2018 203 166.5

(51) Int. Cl.
*F16H 63/34*   (2006.01)
*F16H 63/48*   (2006.01)

(52) U.S. Cl.
CPC ..... *F16H 63/3433* (2013.01); *F16H 63/3475* (2013.01); *F16H 63/3483* (2013.01); *F16H 63/483* (2013.01)

(58) Field of Classification Search
CPC ............ F16H 63/3433; F16H 63/3475; F16H 63/3483; F16H 63/3491; F16H 63/483; F16H 63/34
See application file for complete search history.

(56) References Cited

U.S. PATENT DOCUMENTS 7,804,674 B2   9/2010   Keller et al.
7,861,839 B2   1/2011   Schweiher et al.
(Continued)

FOREIGN PATENT DOCUMENTS

DE   102005018012 A1   10/2006
DE   102006022963 A1   11/2007
(Continued)

OTHER PUBLICATIONS

German Search Report DE102018203166.5 dated Nov. 6, 2018. (14 pages).

*Primary Examiner* — Huan Le
(74) *Attorney, Agent, or Firm* — Dority & Manning, P.A.

(57) ABSTRACT

A parking lock for a transmission of a motor vehicle having an interlocking element of a connecting rod that is biased against a parking lock disengagement direction to bring and keep a ratchet tooth of a locking pawl in engagement with a tooth space of a parking interlock gear during an engagement of the parking lock. The connecting rod is provided a spring force acting in a parking lock engagement direction from an inserting spring and a compressive force acting in the parking lock disengagement direction from a hydraulically actuatable actuator having first piston pressurizable to disengage the parking lock. A detent device actuatable by an electromagnet mechanically fixes the first piston in either a latched or unlatched piston position associated with an engaged or disengaged position of the parking lock, respectively. A system determines a current engagement position of the detent device by assessing an inductance at the electromagnet.

18 Claims, 9 Drawing Sheets

(56) References Cited

U.S. PATENT DOCUMENTS

| | | | |
|---|---|---|---|
| 9,383,012 B2 | 7/2016 | Popp et al. | |
| 9,476,431 B2 * | 10/2016 | Heubner | ................. F16H 63/48 |
| 2014/0041986 A1 * | 2/2014 | Ruehle | ................ F16H 63/3433 |
| | | | 192/220.2 |
| 2015/0008092 A1 | 1/2015 | Mang et al. | |

FOREIGN PATENT DOCUMENTS

| | | |
|---|---|---|
| DE | 102007034768 B3 | 1/2009 |
| DE | 102011107263 A1 | 1/2013 |
| DE | 102013102168 A1 | 9/2013 |
| DE | 102012210571 A1 | 12/2013 |
| DE | 102013000157 B3 | 1/2014 |
| DE | 102016221477 A1 | 5/2018 |
| WO | WO 2018/082949 | 5/2018 |

* cited by examiner

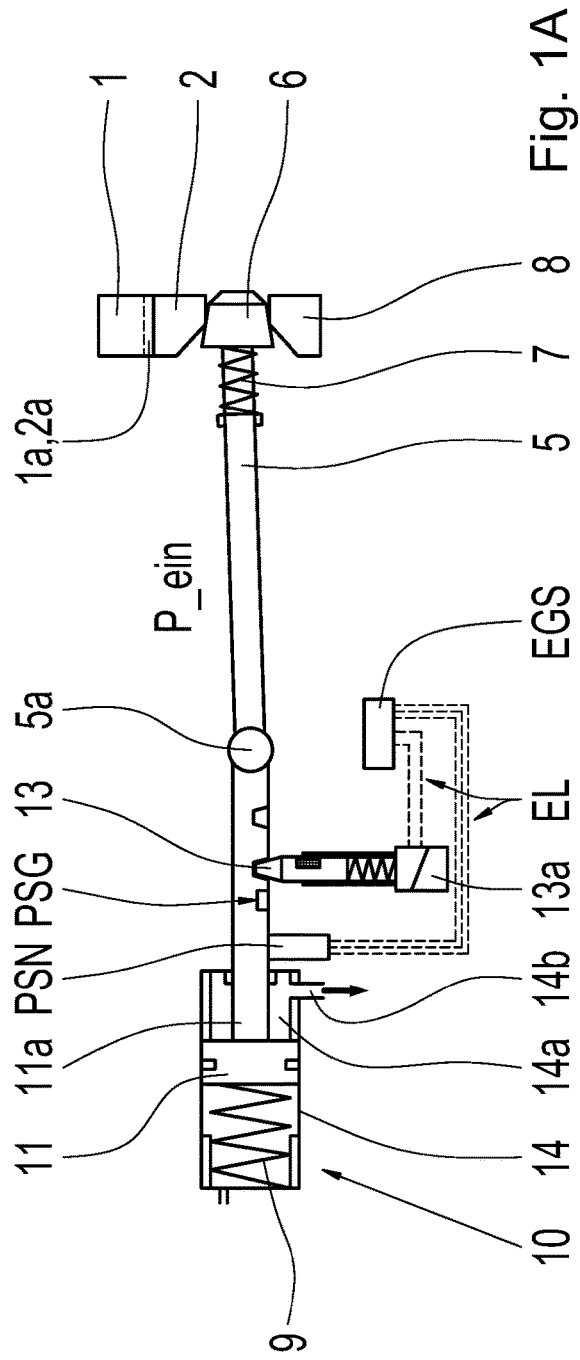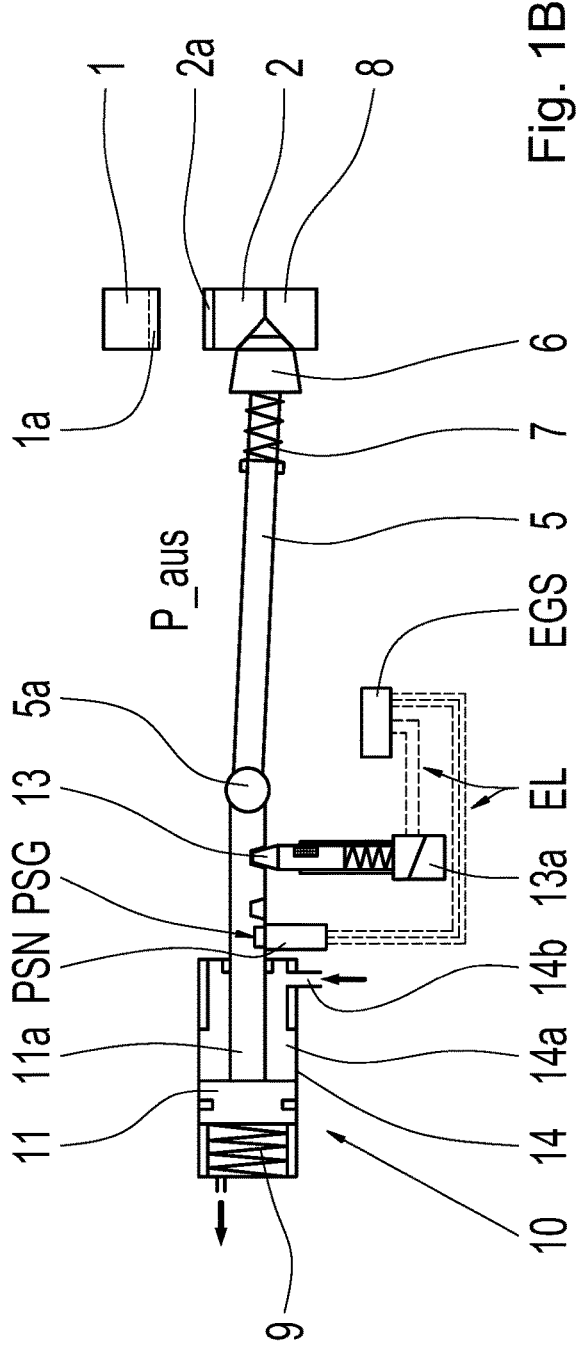

PARKING INTERLOCK IN A VEHICULAR TRANSMISSION

FIELD OF THE INVENTION

The present invention relates to a parking lock in a transmission for a motor vehicle.

BACKGROUND

A parking lock of an automatic or automated transmission installed in a motor vehicle is known as a device which secures the motor vehicle against rolling away. Various designs of these types of parking lock mechanisms are known from the related art. These parking lock mechanisms usually include a locking pawl which is pivotably mounted on a latch bolt and engages into or disengages from a parking interlock gear connected to the output shaft of the automatic transmission, and an interlocking element arranged on a connecting rod to a selector disk mounted on a bolt. In the locked condition, the interlocking element is clamped between the locking pawl and a guiding plate in order to prevent the locking pawl from getting pushed out of a tooth space of the parking interlock gear. In this case, the interlocking element is spring-mounted on the connecting rod via a spring element. The engagement of the parking lock usually takes place mechanically via the spring force of an inserting spring.

In modern automatic or automated transmissions, a hydraulic system is frequently provided for disengaging the parking lock, in the case of which the end of the connecting rod facing away from the interlocking element is articulatedly connected to the selector disk which is operatively connected to a piston rod of a hydraulically actuatable parking lock piston, which is arranged in a parking lock cylinder and is axially displaceable against the force of the inserting spring for disengaging the parking lock and is axially displaceable by the force of the inserting spring for engaging the parking lock.

In order to disengage such a parking lock, the cylinder chamber of the parking lock cylinder is pressurized and pushes the parking lock piston and, therefore, the selector disk against the spring force of the leg spring into the "P_aus" (parking lock disengaged) position. In order to additionally lock the parking lock piston of the parking lock cylinder in this position, a solenoid valve is mostly provided, which is electrically energized in this "P_aus" position of the parking lock cylinder and, as a result, actuates a detent mechanism acting on the parking lock piston.

In order to engage such a parking lock, the solenoid valve is de-energized again, wherein the cylinder chamber of the parking lock cylinder is vented and the mechanical interlock of the parking lock piston is released. Due to the preloaded leg spring on the selector disk, the selector disk and, therefore, the parking lock piston are brought into the "P_ein" (parking lock engaged) position. In so doing, the interlocking element, which is generally a locking cone, is displaced on the guiding plate under the locking pawl and then acts on the locking pawl such that a tooth of this locking pawl engages into a corresponding tooth space of the locking toothing of the parking interlock gear. In a tooth-on-tooth position, the spring element, with the aid of which the interlocking element is spring-mounted on the connecting rod, is preloaded, and so, as soon as a tooth of the locking pawl hits a tooth space, the locking pawl engages into the locking toothing of the parking interlock gear.

Usually, the pressure medium supply to the hydraulic cylinder of such a parking lock system, as well as the venting of this hydraulic cylinder, take place via a control valve or several hydraulically interacting control valves of the electro-hydraulic transmission control unit, which is supplied with pressure medium by an oil pump which is driven by an engine provided for driving the transmission. In order to protect against an unintentional disengagement of the parking lock due to a malposition, which is present upon the start of the engine, of one or several of these control valves acting on the hydraulic cylinder of the parking lock system, DE 10 2012 210 571 A1, which belongs to the applicant, provides that the piston rod of the hydraulic cylinder is equipped with two electromagnetically actuatable locking mechanisms which are actuated by the same electromagnet. In this case, the first locking mechanism mechanically interlocks the piston rod in that position which is associated with the disengaged condition of the parking lock and is present when the hydraulic cylinder is non-pressurized. The second locking mechanism, on the other hand, mechanically interlocks the piston rod in that position which is associated with the engaged condition of the parking lock and, therefore, protects the parking lock system against an unintentional, i.e., fault-induced, disengagement of the previously properly engaged parking lock. A person skilled in the art refers to this type of parking lock actuating system as a "hydraulically actuatable parking lock actuator having bistable piston interlock".

The basic configuration of this type of parking lock system is known, for example, from DE 10 2006 022 963 A1. Reference is made to DE 10 2013 102 168 A1 as a further example of a hydraulic actuator including a bistably latchable parking lock piston, which is suitable for this purpose. In order to consume as little energy as possible, these types of detent mechanisms are usually configured such that the electromagnet provided for actuating the detent mechanisms must be temporarily energized in order to initiate a condition change of the detent mechanisms.

Patent application DE 102017218748.4, which was not previously published and which belongs to the applicant, describes a highly compact parking lock unit, in which the connecting rod, together with the interlocking element of the parking lock, is arranged in parallel to the locking pawl and perpendicularly to a latch bolt inserted in the transmission housing. The locking pawl of the parking lock and a selector lever of the parking lock unit provided for specifying the engagement position of the parking lock are pivotably mounted on the latch bolt. In this case, the end of the connecting rod positioned opposite the interlocking element is articulatedly connected to the selector lever. An inserting spring is provided for engaging the parking lock, the spring force of which acts on the selector lever in the parking lock engagement direction. A hydraulically actuatable actuator is provided for disengaging the parking lock, the compressive force of which acts on the selector lever in the parking lock disengagement direction. In addition, the parking lock includes an emergency release device which is mechanically brought into an operative connection with the selector lever in such a way that the parking lock is manually disengaged.

As a unique structural feature, the actuator described in DE 102017218748.4 includes two pistons, which are arranged in an actuator housing so as to be axially displaceable on the same longitudinal axis, and an electromagnetically actuatable detent device arranged in the actuator housing. The first piston is hydraulically pressurized in order to disengage the parking lock and, upon pressurization, displaces the second piston against the spring force of the inserting spring in the axial direction. The second piston is mechanically connected to the selector lever such that an axial movement of the second piston brings about a rotation of the selector lever about the selector-lever axis of rotation, and vice versa. The detent device is actuatable by an electromagnet such that the detent device mechanically engages the first piston either in a piston position associated with the engaged condition of the parking lock or in a piston position associated with the disengaged condition of the parking lock, when the electromagnet is not energized, and the electromagnet must be energized in order to release the detent in the particular piston position. Therefore, the detent device forms a "bistable detent of the first piston". This structural design makes it possible, in the case of an actuation of the emergency release device, for the second piston to be axially displaced by the selector lever without the first piston leaving its engaged piston position corresponding to the engaged condition of the parking lock.

The problem addressed by the present invention is that of further developing a hydraulically actuatable parking lock including an electro-hydraulic actuator including a bistably latchable hydraulic piston such that both the engagement position of the parking lock as well as the engagement position of the latching of the hydraulic piston are detectable without the need to dispense with the compact design and the other advantages of this parking lock.

SUMMARY OF THE INVENTION

The invention is directed to a parking lock in a transmission of a motor vehicle, which includes a parking interlock gear connected to a transmission shaft of the transmission in a torsion-proof manner, and a locking pawl which is pivotably mounted on a latch bolt. The parking interlock gear includes a locking toothing including tooth spaces, whereas the locking pawl includes a ratchet tooth which, in the engaged condition of the parking lock, engages into a tooth space of the locking toothing of the parking interlock gear and, as a result, blocks the parking interlock gear and the transmission shaft against rotation. In addition, the parking lock includes a connecting rod which is movable in order to specify the engagement position of the parking lock and includes an interlocking element which is spring-mounted counter to the parking lock disengagement direction and which, upon engagement of the parking lock, brings about the engagement of the ratchet tooth of the locking pawl into a tooth space of the locking toothing of the parking interlock gear and, in the engaged condition of the parking lock, prevents the ratchet tooth of the locking pawl from getting pushed out of the tooth space of the locking toothing of the parking interlock gear. In addition, the parking lock includes an inserting spring, the spring force of which in the parking lock engagement direction acts on the end of the connecting rod facing away from the interlocking element, and a hydraulically actuatable actuator, the compressive force of which acts in the parking lock disengagement direction on the end of the connecting rod facing away from the interlocking element.

The parking lock also includes a position sensor for determining the current engagement position ("parking lock engaged", "parking lock disengaged") of the parking lock.

In addition, the parking lock according to the invention includes an electromagnetically actuatable detent device, with the aid of which a piston of the actuator, which is pressurized in order to disengage the parking lock, is mechanically fixed either in a piston position associated with the engaged condition of the parking lock or in a piston position associated with the disengaged condition of the parking lock, depending on the situation.

Preferably, the detent device mechanically fixes the piston of the actuator in the particular present piston position when an electromagnet acting on the detent device is not electrically energized. In this case, the electromagnet acting on the detent device must be electrically energized in order to release the detent in the particular piston position, and so the piston of the actuator, which is pressurized in order to disengage the parking lock, changes its piston position only when the electromagnet acting on the detent device is electrically energized. Alternatively, however, the detent device can mechanically fix the piston of the actuator in the particular present piston position when the electromagnet acting on the detent device is electrically energized, and so, in this case, the electromagnet acting on the detent device must be electrically de-energized in order to release the detent in the particular piston position, i.e., the piston of the actuator, which is pressurized in order to disengage the parking lock, changes its piston position only when the electromagnet acting on the detent device is not electrically energized.

During the fixation of the piston of the actuator, which is pressurized in order to disengage the parking lock, the detent device preferably acts directly on this piston. Alternatively, however, during the fixation of the piston of the actuator, which is pressurized in order to disengage the parking lock, the detent device can act directly on this piston, for example, via a piston rod connected to this piston.

According to the invention, the parking lock includes a system implemented in an electronic control unit of the transmission, with the aid of which the current engagement position of the detent device is determined by assessing the present inductance at the electromagnet. In a particularly advantageous way, a separate sensor on the detent device is dispensed with as a result.

Preferably, this system includes a two-position controller which is configured for controlling the electromagnet of the detent device with the aid of a control signal, as well as a determination means which is configured for determining a time profile of the control signal output by the two-position controller and, on the basis thereof, determining the current engagement position of the detent device.

The determination means is configured, in this case, for determining the frequency or the period of the control signal and determining the electric current supplied to a coil of the electromagnet and, on the basis thereof, determining a present position of an armature of the electromagnet, which is dependent on the frequency or period and on the current and, on the basis of this present position of the armature, inferring the present engagement position of the detent device.

In a refinement thereof, it is provided that the determination means is configured for also incorporating an electrical supply voltage of the coil of the electromagnet in the determination of the present position of the armature of the electromagnet of the detent device. As a mathematical exemplary embodiment, it is provided that the determination means includes a look-up table or a characteristic map or another mathematical function and is configured for determining, with the aid thereof and with the aid of the control signal, the current position of the armature of the electromagnet of the detent device.

The structural design or configuration of the parking lock in connection with the method according to the invention is variable in wide ranges. Thus, in a first structural exemplary embodiment for a parking lock according to the invention, it is provided that a piston rod of the piston of the actuator, which is pressurized in order to disengage the parking lock, is articulatedly connected to the end of the connecting rod facing away from the interlocking element. Such a configuration is distinguished by a slim type of construction and is suitable, in particular, for the case in which the longitudinal axis of the actuator piston and the pivot axis of the locking pawl are arranged axially parallel to one another.

In an advantageous refinement of this first structural exemplary embodiment, it is provided that an emergency release device is provided, which is mechanically brought into an operative connection with the piston rod of the piston of the actuator, which is pressurized in order to disengage the parking lock, such that the parking lock is manually disengaged. In so doing, it is to be taken into account that this emergency release device must also include a means such as an emergency power supply which is suitable for releasing the detent position of the detent device during emergency operation.

In a second structural exemplary embodiment for a parking lock according to the invention, it is provided to provide a selector lever in order to transmit the compressive force of the actuator to the end of the connecting rod facing away from the interlocking element. The selector lever is arranged so as to be displaceable about an selector-lever axis of rotation in order to specify the engagement position ("parking lock engaged", "parking lock disengaged") of the parking lock. In this case, both the element of the actuator transmitting the compressive force as well as the end of the connecting rod facing away from the interlocking element are articulatedly connected to this selector lever. Preferably, a signal transmitter element of the position sensor is arranged on the selector lever in this case, for example, being attached to the selector lever or formed as an integral element of the selector lever. The position sensor is preferably configured as an inductive sensor in this case, although it can also be configured, for example, as a capacitive sensor.

In a preferred refinement of this second structural exemplary embodiment, an emergency release device is provided, which is mechanically brought into an operative connection with the selector lever such that the parking lock is manually disengaged without the need to release the detent device from its detent position. For this purpose, it is provided that the actuator includes two pistons which are arranged so as to be axially displaceable in the actuator housing on the same longitudinal axis 12a, wherein the first piston is hydraulically pressurized in order to disengage the parking lock and, upon pressurization, axially displaces the second piston against the spring force of the inserting spring, wherein the second piston is mechanically connected to the selector lever such that an axial movement of the second piston brings about a rotation of the selector lever about the selector-lever axis of rotation, and vice versa. The electromagnetically actuatable detent device is also arranged in the actuator housing. The detent device mechanically fixes only the first piston either in a piston position associated with the engaged condition of the parking lock or in a piston position associated with the disengaged condition of the parking lock, when the electromagnet acting on the detent device is not electrically energized. In a known way, the electromagnet must be electrically energized in order to release the detent in the particular piston position. According to this particular embodiment, in the case of an actuation of the emergency release device, the second piston is axially displaced by the selector lever without the first piston leaving its latched piston position corresponding to the engaged condition of the parking lock. Advantageously, therefore, an electrical energy source is not required for the emergency disengagement of the parking lock.

For the purpose of actuating the emergency release device, an inner lever is provided, for example, which is arranged within the transmission housing, mechanically acts on the selector lever, and is connected in a torsion-proof manner, via a bolt extending through the housing wall of the transmission housing, to a manually actuatable outer lever arranged outside the transmission housing.

Within the scope of this refinement of the second structural exemplary embodiment, the first and the second pistons of the actuator are successively arranged as viewed in the direction of the piston longitudinal axis. Moreover, the inserting spring is configurable as a compression spring which is axially tensioned between the second piston and the actuator housing and entirely or partially concentrically surrounds a piston rod of the second position, as viewed axially. Both of these two individual measures have a positive effect when the objective is to obtain a compact type of construction of the actuator.

Within the scope of this refinement of the second structural exemplary embodiment, it is also provided that the selector lever is displaceably mounted on the latch bolt, and so the latch bolt longitudinal axis, the locking pawl pivot axis, and the selector-lever axis of rotation are identical and extend at a right angle to the piston longitudinal axis of the actuator. In addition, it is provided that the connecting rod, which is articulatedly attached to the selector lever, is arranged below the locking pawl such that the plane of movement of the connecting rod is arranged essentially in parallel to the plane of movement of the locking pawl, the selector lever, and the piston rod. In addition, it is provided that the parking lock includes a transmission housing-affixed guiding device, which is a guiding plate or a guide sleeve, against which the locking device rests, against a normal force of the locking pawl, during the engagement and disengagement of the parking lock. In this case, the guiding device is alternatively attached to the actuator housing or is an integral part of the actuator housing. All these individual measures have a positive effect when the objective is to obtain a compact type of construction of the parking lock actuating unit. A person skilled in the art will utilize these individual measures, in particular, when the hydraulic actuator provided for disengaging the parking lock is to be arranged transversely to the longitudinal axis of the parking interlock gear.

BRIEF DESCRIPTION OF THE DRAWINGS

The invention is explained in greater detail in the following, by way of example, with reference to the attached figures. In the drawings, the following is shown:

FIG. 1A shows a simplified schematic view of a first exemplary embodiment of a parking lock according to the invention in the "parking lock engaged" engagement position;

FIG. 1B shows a schematic view of the parking lock according to FIG. 1A in the "parking lock disengaged" engagement position;

DETAILED DESCRIPTION

Figure 2A:
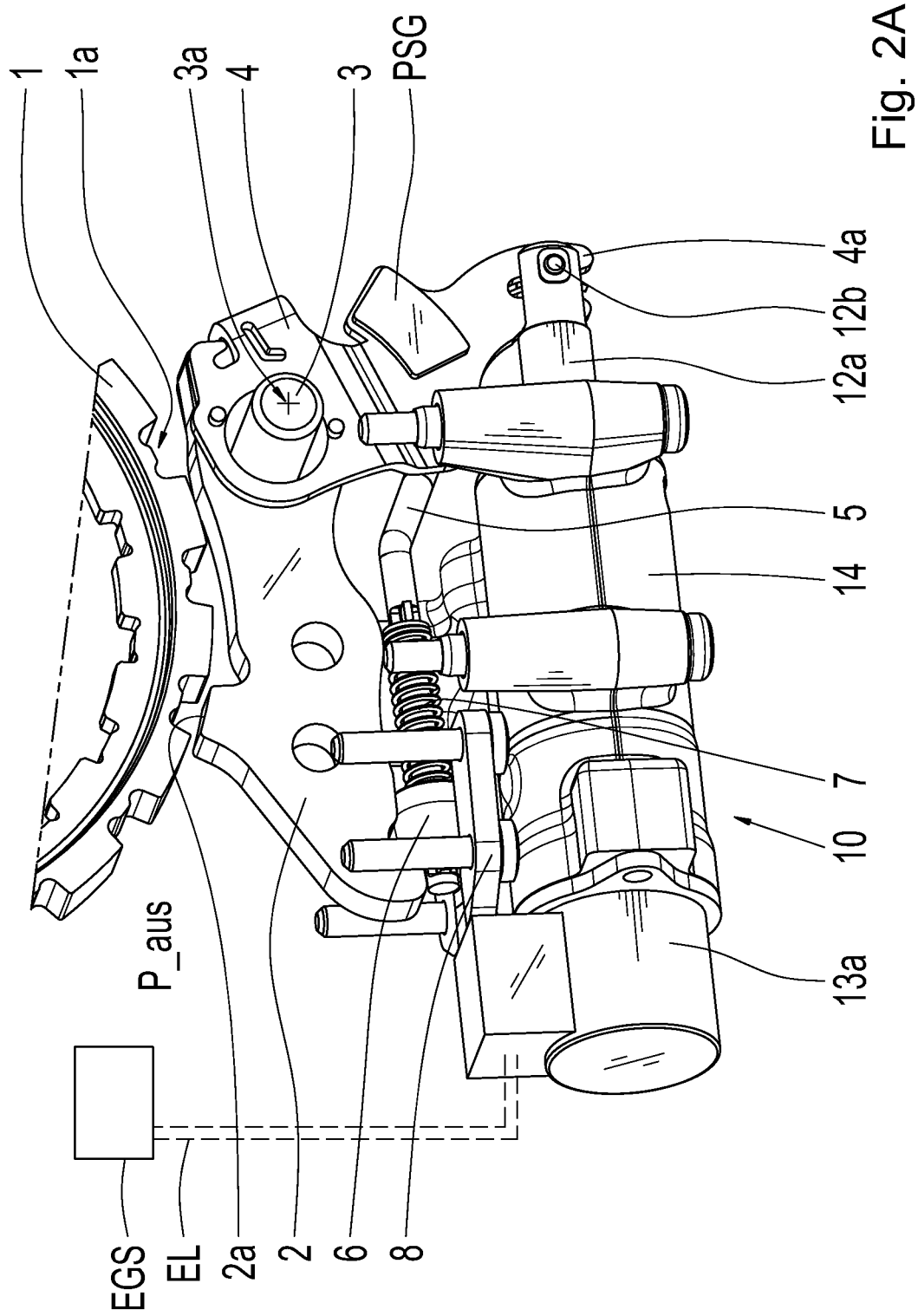
FIG. 2A shows a perspective view of a second exemplary embodiment of a parking lock according to the invention in the "parking lock disengaged" engagement position.

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

A first exemplary embodiment of a parking lock according to the invention for use in a transmission of a motor vehicle is described in greater detail in the following and with reference to FIGS. 1A and 1B. FIG. 1A shows a highly simplified schematic of this parking lock in the "parking lock engaged" engagement position, marked by the reference character P_ein. FIG. 1B, on the other hand, shows a highly simplified, schematic of this parking lock in the "parking lock disengaged" engagement position, marked by the reference character P_aus.

The parking lock shown in FIGS. 1A and 1B includes a pivotably mounted locking pawl 2, the ratchet tooth 2a of which engages into or disengages from a tooth space 1a of a parking interlock gear 1 connected to the transmission shaft, which is not represented here in greater detail, depending on the engagement position P_ein, P_aus, respectively, of the parking lock 1. In addition, the parking lock includes an interlocking element 6 which is mounted so as to be axially displaceable on a connecting rod 5 and is spring-mounted via a spring element 7. In the locked condition, i.e., in the "parking lock engaged" engagement condition, the interlocking element 6 is clamped between the locking pawl 2 and a transmission housing-affixed guiding plate 8 in order to prevent the ratchet tooth 2a from being pushed out of the corresponding tooth space 1a of the parking interlock gear 1. The interlocking element 6, which is spring-mounted against the parking lock disengagement direction, is a locking cone, by way of example, in this case.

The end of the connecting rod 5 facing away from the interlocking element 6 is connected to a piston rod 11a of a piston 11 via a joint 5a. This piston 11 is associated with an actuator 10 and is appropriately axially displaceably arranged in a control housing 14 of this actuator. In order to disengage the parking lock, the piston 11 is pressurized and, as a result, moves the connecting rod 5 in the parking lock disengagement direction. The corresponding pressure chamber of the actuator 10 is marked as 14a and the corresponding pressure connection is marked as 14b. For the purpose of engaging the parking lock, an inserting spring 9 is provided, which is a compression spring, by way of example, in this case, is arranged on the side of the piston 11 in the control housing 14 of the actuator 10 facing away from the compression chamber 14a and, in this case, is axially tensioned between the piston 11 and a housing wall of the control housing 14, and so the spring force of the inserting spring 9 acts via the piston 11, the piston rod 11a, and the joint 5a on the end of the connecting rod 5 facing away from the interlocking element 6. Therefore, the piston 11/piston rod 11a and connecting rod 5 are axially movable in order to specify the engagement position of the parking lock.

In addition, the actuator 10 includes a bistable detent device 13 for its piston 11, which is, by way of example, an electromagnetically actuatable pin detent for the piston rod 11a. For this purpose, the piston rod 11a includes two recesses, into which the pin of the detent device 13 can engage, wherein the recess closer to the piston 11 is associated with the engagement position P_ein ("parking lock engaged"), whereas the recess closer to the joint 5a is associated with the engagement position P_aus ("parking lock disengaged"). The pin of the detent device 13 is spring-mounted, and so the pin can independently engage into these recesses of the piston rod 11a when the pin is not held in the release position via energization of the electromagnet 13a of the detent device 13. Therefore, the electromagnet 13a must be energized in order to release the detent in the particular piston position of the piston 11. An electronic control unit EGS, which is electrically connected to the electromagnet 13a via electrical leads EL, is provided for the electrical control of the electromagnet 13a.

A preferably inductively operating position sensor is provided for detecting the actual engagement position of the parking lock, which measures the axial position of the piston rod 11a of the actuator piston 11. For this purpose, a signal transmitter element PSG is arranged on the piston rod 11a. The signal receiver element PSN of the position sensor interacting with this signal transmitter element PSG is electrically connected to the electronic control unit EGS via electrical leads EL.

According to the invention, a method is implemented in the electronic control unit EGS, with the aid of which the actual engagement position of the detent device 13 is determined by assessing the present inductance at the electromagnet 13a. The details of this method will be further discussed in greater detail below.

Figure 2B:
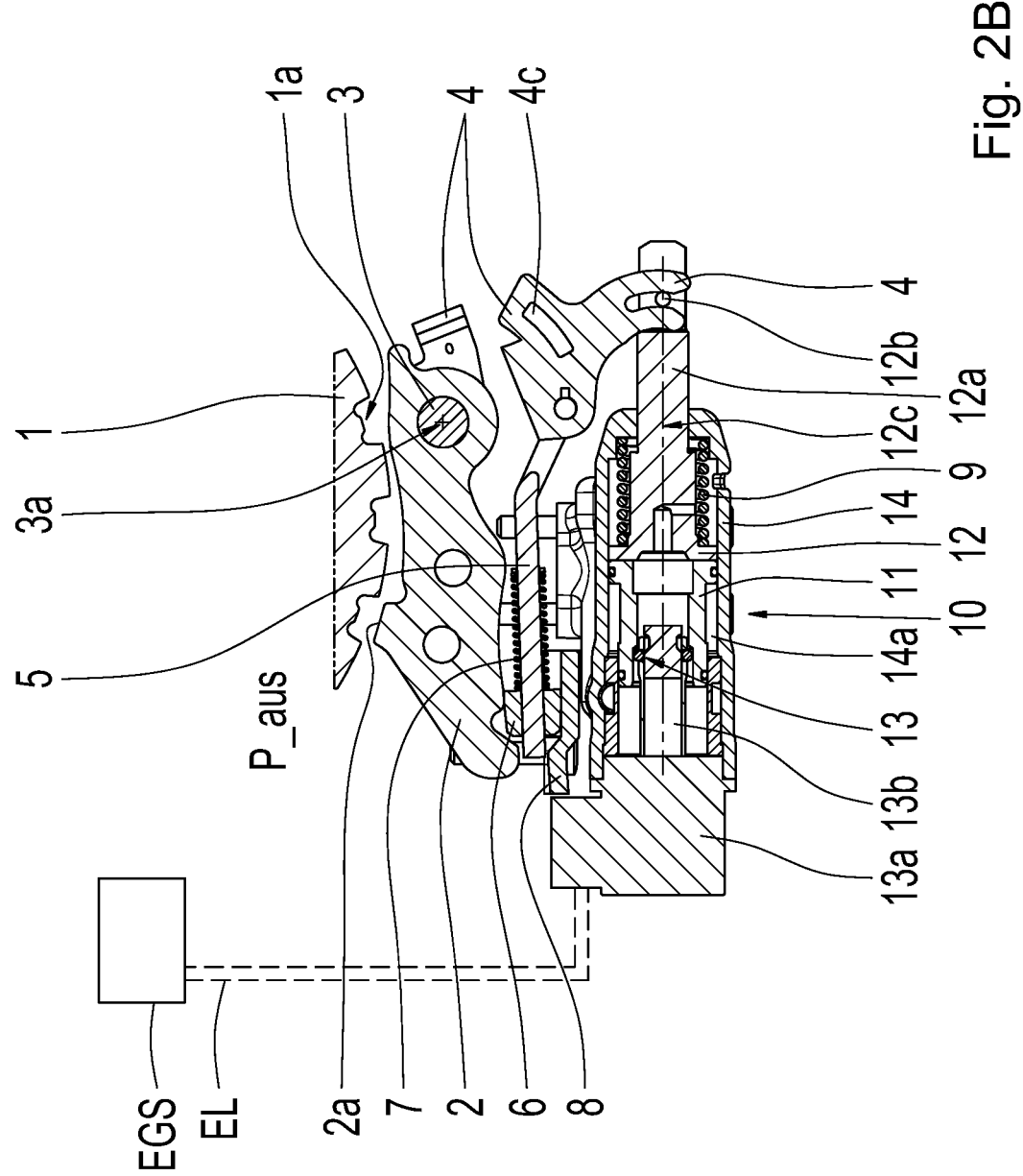
FIG. 2B shows a section view of the parking lock according to FIG. 2A in the "parking lock disengaged" engagement position.

A second exemplary embodiment of a parking lock according to the invention for or in a transmission of a motor vehicle is described in greater detail in the following and with reference to FIGS. 2A and 2B. FIG. 2A shows a three-dimensional, perspective representation of this parking lock in the "parking lock disengaged" engagement position, marked by the reference character P_aus. FIG. 2B shows a corresponding section view thereof.

The parking lock shown in FIGS. 2A and 2B includes a locking pawl 2 pivotably mounted on a latch bolt 3, the ratchet tooth 2a of the locking pawl 2 engages into or disengages from a tooth space 1a of the parking interlock gear 1 connected to the transmission shaft of the transmission, which is not represented here in greater detail, depending on the engagement position P_ein, P_aus, respectively, of the parking lock. The parking lock also includes an interlocking element 6 which is arranged on a connecting rod 5 to a selector lever 4 and which is spring-mounted via a spring element 7. In the locked condition, i.e., in the "parking lock engaged" engagement condition, the interlocking element 6 is clamped between the locking pawl 2 and a transmission housing-affixed guiding plate 8 in order to prevent the ratchet tooth 2a from being pushed out of the corresponding tooth space 1a of the parking interlock gear 1. The interlocking element 6 concentrically encloses the connecting rod, and so the interlocking element 6 is mounted so as to be axially displaceable on the connecting rod 5. The interlocking element 6, which is spring-mounted against the parking lock disengagement direction, is a locking cone, by way of example, although it is alternatively, for example, a roller element.

In an installation-space-saving way, the selector lever 4 is displaceably mounted on the latch bolt 3, and so the latch bolt longitudinal axis 3a, the locking pawl pivot axis, and the selector-lever axis of rotation are identical and extend at a right angle to the piston longitudinal axis 12c of the second piston 12 of the actuator 10.

The end of the connecting rod 5 facing away from the interlocking element 6 is articulatedly connected to the selector lever 4. In order to be able to engage and disengage the parking lock, the selector lever 4 includes an engaging piece 4a which is connected to a hydraulically actuatable actuator 10, with the aid of which the engagement position of the parking lock is specified.

The actuator 10 includes a first piston 11 and a second piston 12, which are axially displaceably arranged on the same longitudinal axis in a control housing 14 of the actuator 10, wherein only the first piston 11 is hydraulically pressurized to disengage the parking lock. Upon pressurization, the first piston 11 displaces the second piston 12 in the axial direction against the spring force of an inserting spring 9 which is a compression spring tensioned axially between the second piston 12 and the actuator housing 14 and, viewed axially, concentrically encloses a piston rod 12a of the second piston 12. The second piston 12 is mechanically connected to the selector lever 4 via a pin 12b which is inserted into the piston rod 12a and engages into the engaging piece 4a of the selector lever 4, and so an axial movement of the second piston 12 brings about a rotation of the selector lever 4 about the selector-lever axis of rotation 3a. On the other hand, a rotation of the selector lever 4 about its axis of rotation 3a also always brings about an axial movement of the second piston 12.

The actuator 10 includes a bistable detent device 13 for its first piston 11, which is arranged within the actuator housing 14—centrally within the first piston 11, by way of example, in this case—and is electromagnetically actuated by an electromagnet 13a, which is arranged on the actuator housing 14, such that the detent device 13 mechanically latches the first piston 11 either in a piston position associated with the engaged condition P_ein of the parking lock or in a piston position associated with the disengaged condition P_aus of the parking lock, when the electromagnet 13a is not energized. The electromagnet 13a must be energized in order to release the detent in the particular piston position of the first piston 11. An electronic control unit EGS is provided for the electrical control of the electromagnet 13a, which is electrically connected to the electromagnet 13a via electrical leads EL and is preferably also an electronic control unit for the transmission.

A signal transmitter element PSG of a preferably inductive or capacitive position sensor is arranged on the selector lever 4 for detecting the actual engagement position of the parking lock. For the sake of simplicity of the representation, the transmission housing-affixed signal receiver element of the position sensor is not represented in greater detail, although it is likewise electrically connected to the electronic control unit EGS via electrical leads. Instead of the signal transmitter element PSG being attached to a mounting section 4c of the selector lever 4 as provided in the represented exemplary embodiment, the signal transmitter element PSG can also be an integral element of the selector lever 4.

According to the invention, a method is implemented in the electronic control unit EGS, with the aid of which the actual engagement position of the detent device 13 is determined by assessing the present inductance at the electromagnet 13a. The details of this method will be discussed in greater detail further below.

As is apparent in FIGS. 2A and 2B, in the exemplary embodiment represented here, the connecting rod 5 articulatedly attached to the selector lever 4 is arranged, viewed spatially, below the locking pawl 2 in parallel to the locking pawl 2 and perpendicularly to the latch bolt 3, and so the plane of movement of the connecting rod 5 is arranged essentially in parallel to the plane of movement of the locking pawl 2, the selector lever 4, and the piston rod 12a. This special arrangement is, advantageously, highly installation-space-saving.

In the exemplary embodiment represented here, the guiding plate 8 is attached to the control housing 14 of the actuator 10, although, alternatively, it can also be an integral part of the control housing 14. Instead of being a guiding plate 8, the transmission housing-affixed guiding device—against which the locking device 6 rests, against a normal force of the locking pawl 2, during engagement and disengagement of the parking lock—is, for example, a guide sleeve which is then attached to the control housing 14 or is integrated into the control housing of the actuator 10. The control housing 14 of the actuator 10 itself can also be, for example, an integral part of an electro-hydraulic transmission control unit of the transmission.

In the end, an engagement of the parking lock essentially takes place due to the spring force of the inserting spring 9, whereas a disengagement of the parking lock essentially takes place due to the hydraulic pressure of the actuator 10, which is applied onto the first piston 11, against the spring force of the inserting spring 9, if the hydraulic and electrical supply necessary for controlling the actuator 10 are available.

Figure 3A:
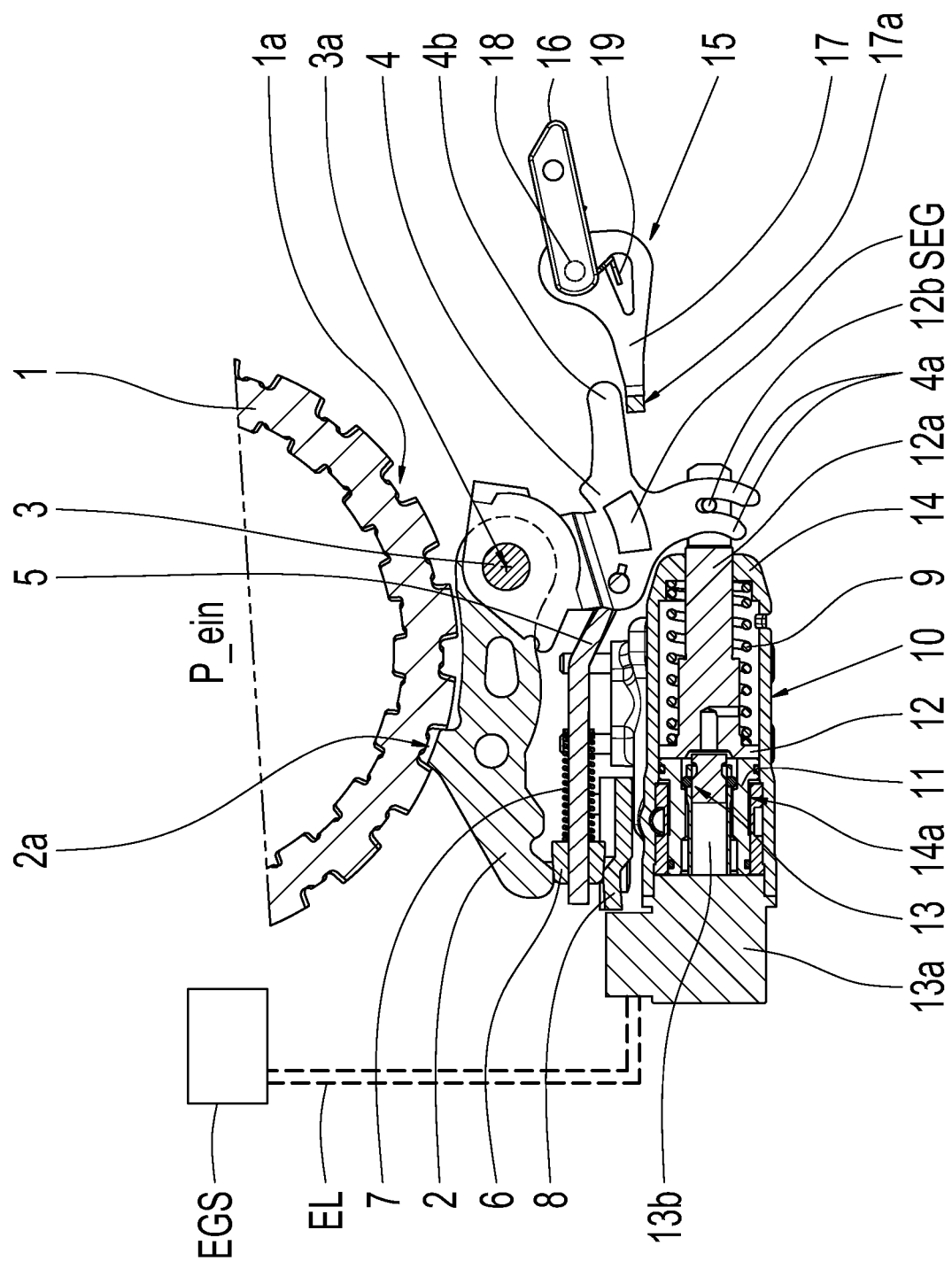
FIG. 3A shows a section view of a third exemplary embodiment of a parking lock according to the invention in the "parking lock engaged" engagement position, including an emergency release device.
Figure 3B:
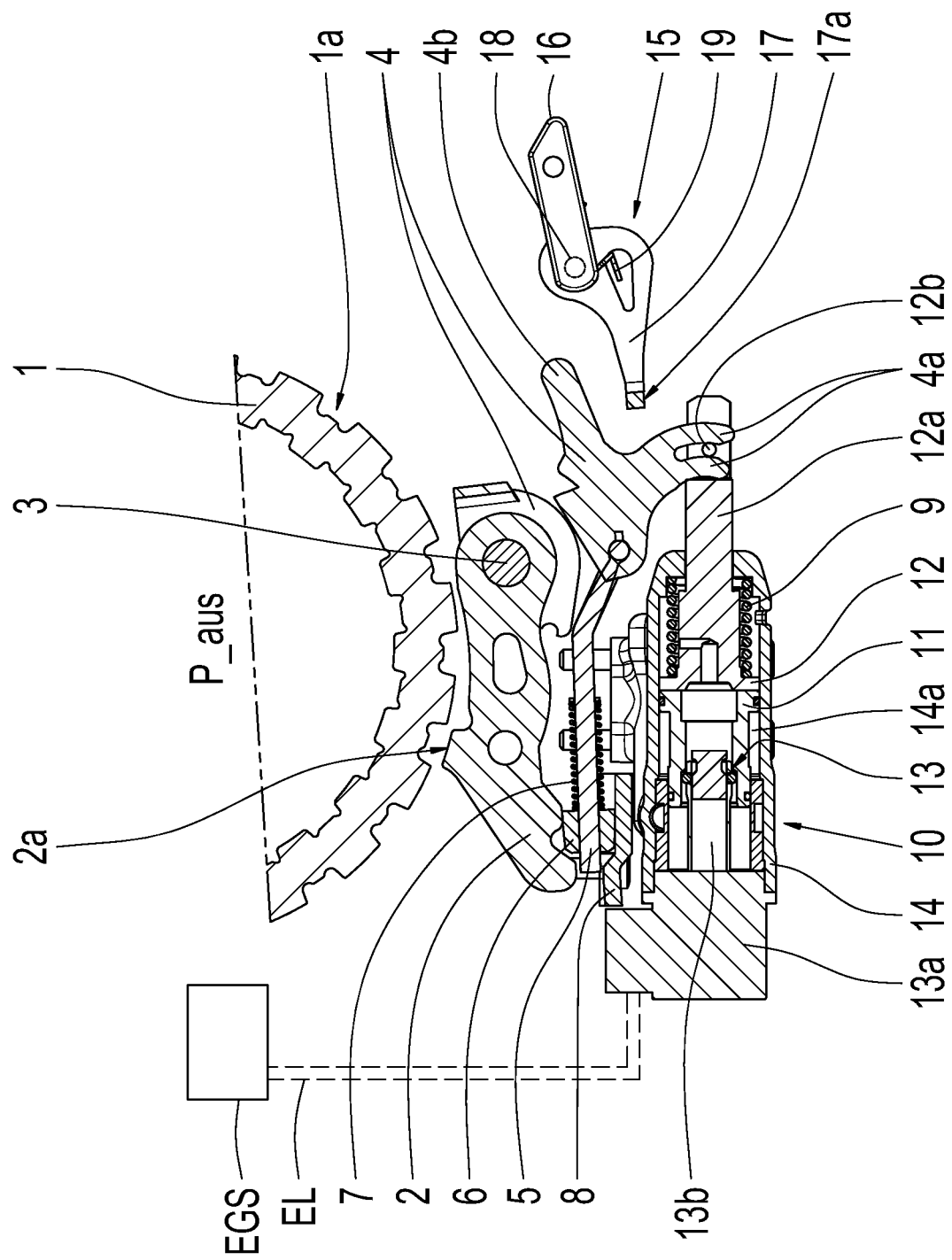
FIG. 3B shows a section view of the parking lock according to FIG. 3A in the "parking lock disengaged" engagement position.
Figure 3C:
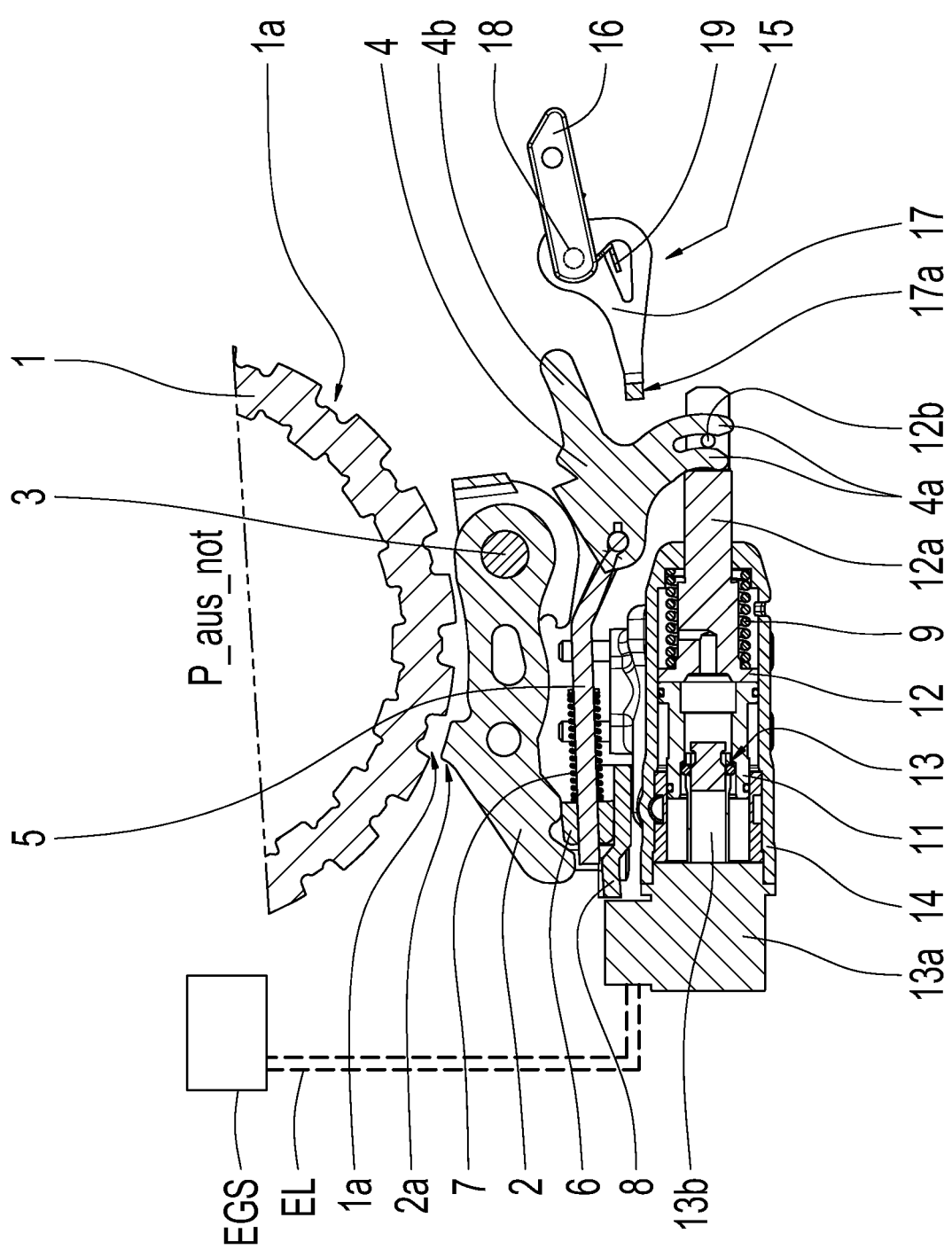
FIG. 3C shows a section view of the parking lock according to FIG. 3A in the "parking lock emergency-released" engagement position.

Referring to FIGS. 3A, 3B, and 3C, a preferred third exemplary embodiment of a parking lock according to the invention additionally includes an emergency release device 15 by which the parking lock is mechanically transferable from the condition P_ein into the condition P_aus in the event of failure of the hydraulic and/or electrical control of the actuator 10. The emergency release device 15 is mechanically brought into an operative connection with the selector lever 4 for this purpose. FIG. 3A shows a section view of this parking lock in the "parking lock engaged" engagement position P_ein. FIG. 3B, on the other hand, shows a section view of this parking lock in the "parking lock disengaged" engagement position P_aus. FIG. 3C shows a section view of this parking lock in a "parking lock emergency-released" engagement position P_aus_not, in which the parking lock is disengaged as a result of an actuation of the emergency release device 15.

In the exemplary embodiment represented here, the emergency release device 15 includes an outer lever 16 which is arranged on the outside of the transmission housing of the transmission, which is not represented here in greater detail, and an inner lever 17 which is arranged in the interior space of the transmission housing and is connected in a torsion-proof manner to this outer lever 16 via a bolt 18. The inner lever 17 includes a leg 17a which, in the case of an actuation of the emergency release device 15, mechanically acts directly on a leg 4b of the selector lever 4, and so the selector lever 4 rotates on its axis of rotation 3a in the direction of rotation intended for the disengagement of the parking lock. The configuration of the emergency release depicted here is to be considered merely as an example. Thus, the inner lever 17 can also be configured, for example, such that it mechanically acts directly on the piston rod 12a of the second piston 12 during the emergency release of the parking lock, and so the force required for the emergency release of the parking lock is transmitted from the inner lever 17 via the piston rod 12a to the selector lever 14.

The interaction with the actuator 10 is essential for the functionability of the emergency release device 15. As described above, the actuator 10 includes a bistable detent device 13 for its first piston 11, which is arranged within the actuator housing 14 and is electromagnetically actuatable by an electromagnet 13a, which is arranged on the actuator housing 14, such that the detent device 13 mechanically interlocks the first piston 11 against axial movement either in a piston position associated with the engaged condition P_ein of the parking lock or in a piston position associated with the disengaged condition P_aus of the parking lock, when the electromagnet 13a is not energized. Only the particular configuration of the actuator 10 with its two pistons 11, 12 makes it possible, in the case of an actuation of the emergency release device 15, for the second piston 12 of the actuator 10 to be axially displaced by the selector lever 4 without the first piston 11 of the actuator 10 exiting its piston position corresponding to the engaged condition P_ein of the parking lock, which is explained in greater detail in the following with reference to functional sequences during the engagement and disengagement of the parking lock.

Proceeding from the condition P_ein, in which the parking lock is engaged, the embodiment of the actuator 10 according to the invention requires the following functional sequence during the disengagement of the parking lock during the normal operation of the automatic transmission, provided the hydraulic and electrical supply of the actuator 10 is ensured:

In the basic condition P_ein represented in FIG. 3A, a pressure chamber 14a, which is formed by an outer surface of the control housing 14 and an end face of the first piston 11, is vented on the control-unit side. The two pistons 11 and 12 of the actuator 10 are in their first end position closer to the electromagnet 13a, as shown in FIG. 3A, wherein the first piston 11 is mechanically fixed by the detent device 13. The electromagnet 13a of the detent device 13 is dead. The locking cone 6 is in its locking position, in which it is clamped between the guiding plate 8 and the locking pawl 2. In order to even enable the parking lock to be disengaged proceeding from the engagement position P_ein, the electromagnet 13a is initially energized, with the result that the detent device 13 releases the first piston 11 which it had previously interlocked. Approximately at the same time, the previously non-pressurized pressure chamber 14a of the actuator 10 is pressurized, with the result that the first piston 11 moves axially in the direction opposite to the pressure chamber, against the spring force of the inserting spring 9, due to the pressure acting on the first piston 11 and, in so doing, carries the second piston 12 along until a predefined second end position has been reached. The axial movement of the second piston 12, in turn, is converted, via the pin 12b inserted in the piston rod 12a and the engaging piece 4a of the selector lever 4, into a turning motion of the selector lever 4 about its axis of rotation 3a in the direction of rotation intended for the disengagement of the parking lock. This turning motion of the selector lever 4 is conveyed via the connecting rod 5 to the locking cone 6, and so the locking cone 6 is mechanically pulled out of its locking position, with the result that the locking pawl 2 is pivoted due to the force vectors acting on it and, in so doing, the ratchet tooth 2a is pivoted out of the tooth space 1a of the locking toothing of the parking interlock gear 1. The parking lock is now in the condition P_aus; all components involved are now in the position represented in FIG. 3B. In this condition, the electromagnet 13b is now de-energized again, and so the detent device 13 mechanically fixes the first piston 11 in its second end position further away from the electromagnet 13a. This mechanical detent of the first piston 11 secures the parking lock system against an unintentional engagement of the parking lock, which would be possible, for example, in the event of a pressure level which is not sufficient for the situation or in the event of a hydraulic defect in the pressure supply to the pressure chamber 14a of the actuator 10.

Proceeding from the condition P_aus, in which the parking lock is disengaged, the embodiment of the actuator 10 according to the invention requires the following functional sequence during the engagement of the parking lock during the normal operation of the automatic transmission, provided the hydraulic and electrical supply of the actuator 10 is ensured:

In the basic condition P_aus represented in FIG. 3B, the pressure chamber 14a of the actuator 10 acting on the first piston 11 is pressurized. Both pistons 11, 12 of the actuator 10 are in their respective second end position which is further away from the electromagnet 13a, as shown in FIG. 3B, wherein the first piston 11 is mechanically fixed by the detent device 13. The electromagnet 13a of the detent device 13 is dead. In order to enable the parking lock to be engaged proceeding from the engagement position P_aus, the electromagnet 13a is initially energized, with the result that the detent device 13 releases the first piston 11 which it had previously interlocked. Approximately at the same time, the previously pressurized pressure chamber 14a of the actuator 10 is vented on the control-unit side, with the result that the second piston 12 moves axially in the direction of the first piston 11 due to the spring force of the inserting spring 9. This axial movement of the second piston 12 is mechanically conveyed, on the one hand, to the first piston 11 which, as a result, is pushed axially into its first end position closer to the electromagnet 13a. On the other hand, the axial movement of the second piston 12 is converted, via the pin 12b inserted in the piston rod 12a and the engaging piece 4a of the selector lever 4, into a turning motion of the selector lever 4 about its axis of rotation 3a in the direction of rotation intended for the engagement of the parking lock. This turning motion of the selector lever 4 is conveyed, in turn, via the connecting rod 5 to the locking cone 6 and via the locking cone 6 to the locking pawl 2, with the result that, when the ratchet tooth 2a hits a tooth space 1a of the locking toothing of the parking interlock gear 1 and is not repelled by the outer diameter of the locking toothing due to a rotational speed of the parking interlock gear 1 which is too high, the ratchet tooth 2a engages into this tooth space 1a in a form-fit manner and, as a result, fixes the parking interlock gear 1. The parking lock is now in the condition P_ein; all components involved are now once more in the position represented in FIG. 3A. In this condition P_ein, the electromagnet 13a is now de-energized again, and so the detent device 13 mechanically fixes the first piston 11 in its first end position closer to the electromagnet 13a.

A failure of the actuation of the actuator 10 in the condition P_aus, in which the parking lock is disengaged, does not pose a problem, since the parking lock cannot independently change its engagement position due to the still-engaged mechanical interlock of the first piston 11, and the automatic transmission therefore remains, unchanged, in the engagement position P_aus known to the driver and the motor vehicle is moved with the automatic transmission unchanged.

In the event of a failure of the actuation of the actuator 10 in the condition P_ein, in which the parking lock is engaged, the emergency release device 15 is available to the driver of the motor vehicle in which the automatic transmission including the parking lock according to the invention is installed, in order to enable the parking lock to be disengaged even without the actuator 10. In the basic condition P_ein, the components involved are in their respective positions as shown in FIG. 2. An actuation of the emergency release device 15 initiates a pivoting of the levers 16 and 17 of the emergency release device 15, which are connected to one another in a torsion-proof manner. During this pivoting, the leg 17a of the inner lever 17 presses against the leg 4b of the selector lever, with the result that the selector lever 4 rotates about its axis of rotation 3a in its direction of rotation intended for the disengagement of the parking lock and, in so doing, as in the case during normal operation, pulls the locking cone 6 out of its locking position with the aid of the connecting rod 5 and thereby disengages the parking lock. Due to the fact that the selector lever 4 is also mechanically connected, via its engaging piece 4a and the pin 12b, to the piston rod 12a of the second piston 12 of the actuator 10, the actuation of the emergency release device 15 also brings about an axial displacement of the second piston 12 up to its second end position. The first piston 11 of the actuator 10, on the other hand, mechanically remains in its first end position, interlocked against axial movement. The parking lock is now in the condition P_aus_not, in which the parking lock is "emergency-released" via actuation of the emergency release device 15; all components involved are in the position represented in FIG. 3C.

If the actuation of the emergency release device 15 is now ceased, the two levers 16 and 17 of the emergency release device 15, which are connected to one another in a torsion-proof manner, pivot back into their initial position, due to the restoring force of a leg spring 19 provided here by way of example, with the result that the spring force of the inserting spring 9 now initiates the engagement of the parking lock.

A regular pivoting of the selector lever 4 during normal operation of the transmission—i.e., with a fully operable actuator 10—has no mechanical effect whatsoever on the inner lever 17 and the outer lever 16 of the emergency release device 15.

In all three exemplary embodiments of a parking lock according to the invention, in addition to the position sensor, which provides information regarding the actual position of the connecting rod actuating the parking lock and, therefore, information regarding the actual engagement position of the parking lock, a method for operating the actuator 10 is integrated, with the aid of which the actual engagement position of the detent device 13 is determined without requiring a sensor for this purpose. This method is implemented in the electronic control unit EGS and is described in greater detail in the following and with reference to FIGS. 4 to 7.

The method utilized according to the invention makes use of the fact that the operating condition of an electromagnet is inferable from inherent measuring effects within the electromagnet. Thus, for example, patent application DE 10 2016221477.2, which was not previously published and which belongs to the applicant, describes a device which includes a two-position controller for operating an electromagnet, as well as a determination means configured for determining a time profile of a control signal output by the two-position controller and, on the basis thereof—in particular, on the basis of the dynamics of the control signal—determining the current operating condition of the electromagnet. In addition, this device is configured for supplying an electric current to a coil of the electromagnet on the basis of the control signal. In accordance with the time profile of the control signal, a characteristic current profile with respect to time forms. The operating condition of the electromagnet is inherently contained therein, because the operating condition essentially determines the speed at which the current increases and then decreases, as well as the maximum and average current levels.

DE 10 2016221477.2 makes use of the characteristic closed-loop control of the two-position controller—i.e., the situation that the time profile of the current supplied to the coil of the electromagnet is also reflected in the control signal itself—and therefore utilizes the control signal currently output by the two-position controller in order to very simply and accurately infer the current operating condition of the electromagnet on the basis thereof.

The device proposed in DE 10 2016221477.2 for an electromagnetically actuatable linear actuator which preferably includes precisely one coil is particularly well suited. All the above-described exemplary embodiments of a parking lock according to the invention utilize such a type of actuator as the electromagnet 13a, the armature of which is marked in FIG. 4 by reference character 13b and the coil of which is marked by reference character 13c. The armature 13b is moved magnetically with the aid of the coil 13c. This movement of the armature 13b is tapped and is mechanically utilized, within the scope of the parking lock according to the invention, as an actuating movement for actuating the detent device 13a of the actuator 10. By utilizing the device and the method from DE 10 2016221477.2, the current engagement position of the detent device 13a is derived directly from the current position of the armature 13b within the actuator 10. A temperature of the electromagnet 13a is also determined, if necessary, in addition to the armature position.

The utilization of the device and the method from DE 10 2016221477.2 for a parking lock including a hydraulically actuatable actuator 10, the piston 11 of which includes an electromagnetically actuatable, bistable piston latching 13, offers the advantage that only a few means need to be utilized in order to obtain information regarding the current engagement position of the detent device 13 of the actuator 10. This information is further processed immediately in an electronic way, for example, for the electrical control of the electromagnet 13a. Due to the utilization of the integrated sensor effects of the electromagnet 13a, the tolerance chain is also shortened as compared to external sensors which are normally utilized.

The two-position controller utilized within the scope of the parking lock according to the invention is preferably an analog two-position controller. This is, in particular, a two-position controller which is discrete, i.e., is installed in hardware. In the case of hardware which is appropriately fast, the analog two-position controller can also be a software module of the control unit EGS or of an alternative microcontroller of the control unit EGS.

Figure 4:
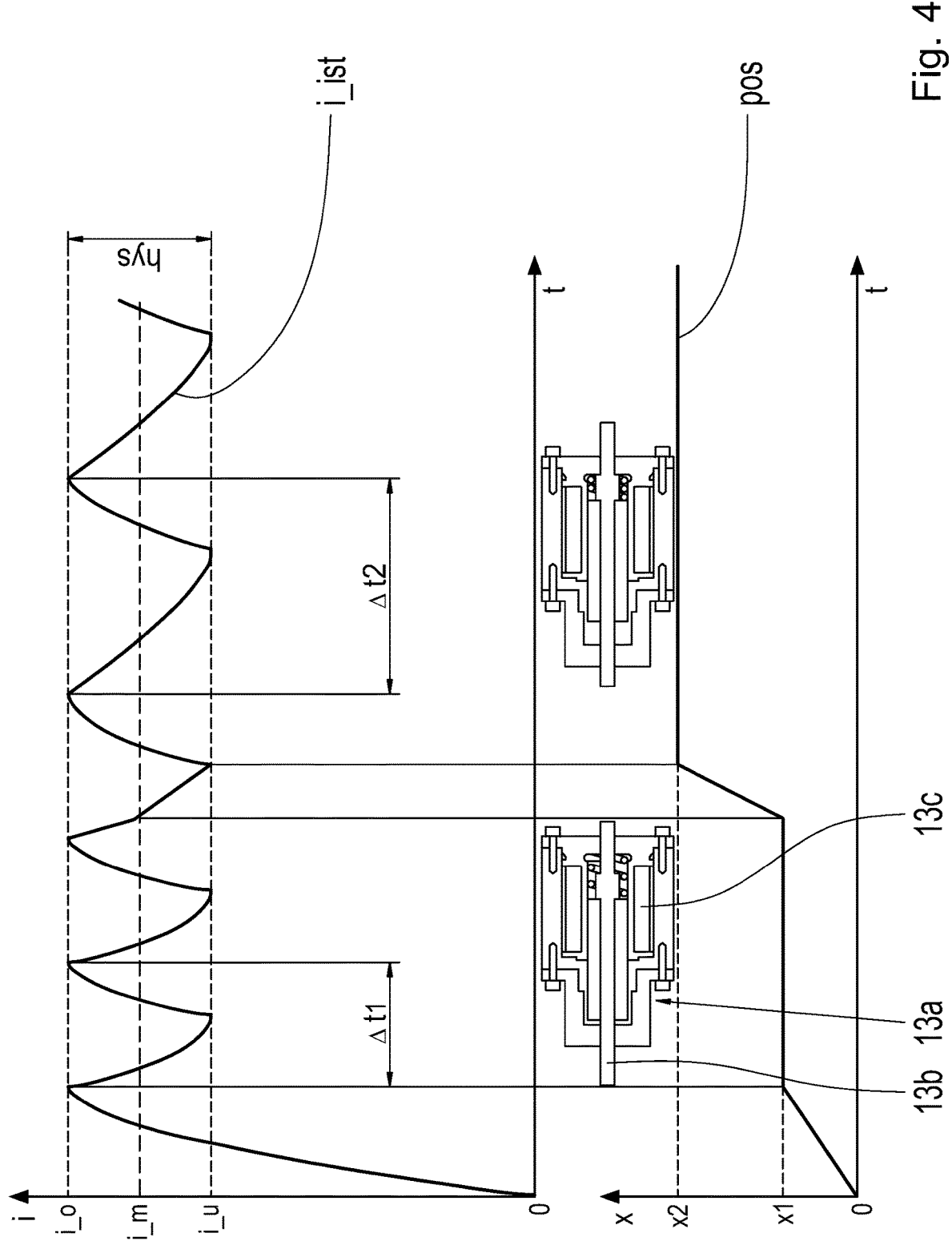
FIG. 4 shows a signal curve for the electromagnet of the detent device of the actuator of a parking lock according to the invention.

FIG. 4 shows a time profile of the position pos of the armature 13b of the electromagnet 13a, which results when the coil 13c of the electromagnet 13a is controlled with the aid of the above-described two-position controller. FIG. 4 also shows the corresponding time profile of the actuating current i_ist output by the two-position controller in this case. An upper current limit i_o and a lower current limit i_u are specified to the two-position controller in this case, with the aid of which the current supplied to the coil 13c of the electromagnet 13a is limited. The two-position controller also preferably includes a comparator circuit as well as an RS flip flop (=reset/set flip flop) in order to be able to toggle the current between the current limits i_o, i_u with the aid of the comparator circuit and the RS flip flop, whereby the current i_ist fluctuates between the current limits i_o and i_u, as shown in the upper part of FIG. 4. The current limits i_o and i_u for this purpose are specified to the two-position controller, for example, by a microcontroller of the control unit EGS.

Within the two-position controller, the present current value i_ist, which is preferably in the form of a measured quantity, is compared with the predefined current limits. If the upper current limit i_o is exceeded, the energization of the electromagnet 13a is ceased. If the lower current limit i_u is fallen below, the energization is started again. The signal for the start and the end of the energization of the coil 13c of the electromagnet 13a, which is output by the RS flip flop, preferably acts as the control signal for a bridge driver of a bridge circuit, in particular, a so-called H-bridge circuit. This bridge circuit is utilized, in turn, for providing the current. The outputs of the bridge circuit are therefore electrically contacted to the electrical inputs of the coil 13c of the electromagnet 13a. The bridge driver controls the bridge circuit according to the control signal output by the two-position controller. This, in turn, brings about an appropriate electrical energization of the coil 13c. This yields the time profile of the current i_ist at the coil 13c shown in the upper part of FIG. 4.

Due to the specification of the upper current limit i_o and the lower current limit i_u, a current band hys results, shown in FIG. 4, within which the electromagnet 13a is operated. As is apparent in FIG. 4, characteristic dynamics of the current increase and the current decrease result within the current band hys, in which the information regarding the operating condition of the electromagnet 13a, in particular its armature position pos and its temperature, is contained. These dynamics, in turn, are also extractable via the frequency or the period and via the switch-on time or the duty cycle (DC), i.e., the ratio of the switch-on time to the switching period of the control signal output by the two-position controller. The determination means can therefore infer the operating condition of the electromagnet 13a on the basis of the frequency or period and the switch-on time or the duty cycle of the control signal.

The determination means includes, for example, a so-called capture input, with the aid of which the determination means taps the control signal from the two-position controller. This type of capture input is an input, for example, of a microprocessor, with the aid of which the switching instants of binary signals are determined with high accuracy. The control signal is, in particular, a PWM signal (PWM=pulse-width modulated/pulse width modulation).

Within the scope of the present invention, the determination means is configured for determining a frequency of the control signal output by the two-position controller, with the aid of which the coil 13c of the electromagnet 13a is actuated in order to release the detent device 13, as well as the electric current i_ist which is conducted through the coil 13c in order to release the detent device 13. In addition, the determination means is configured for determining the current position of the armature 13b of the electromagnet 13a on the basis of this determined frequency and this determined current and, on the basis thereof, inferring the current engagement position of the detent device 13.

In addition, the determination means can also be configured for determining a switch-on time of the control signal output by the two-position controller and, on the basis of the switch-on time, determining the temperature of the electromagnet 13a which is electrically controlled with the aid of this control signal. A separate temperature sensor is therefore not required. The temperature which is determined in this way represents a temperature of the coil 13c of the electromagnet 13a. The electrical resistance of the coil 13c changes, after all, depending on the temperature and the material. In the case of the conductive materials usually utilized in coils, such as copper, the electrical resistance increases as the temperature increases. In order to be able to make the required current available at a constant supply voltage, the switch-on time must therefore be adapted to the coil temperature. Thus, a high coil temperature requires a comparatively long switch-on time, while a low coil temperature requires a comparatively short switch-on time in order to make the same current available. Therefore, there is a unique relationship between the switch-on time and the coil temperature. The coil temperature of the electromagnet 13a is therefore determined on the basis of the switch-on time or, equivalently, the duty cycle. The coil temperature determined by the determination means is utilized for changing the electrical power supplied to the electromagnet 13a, for example, as component protection, in that the electrical power supplied to the electromagnet 13a is reduced in a targeted manner at a relatively high coil temperature, or the coil temperature is utilized, for example, for increasing the actuating force of the electromagnet 13 acting on the detent device 13, in that the electrical power supplied to the electromagnet 13a is increased in a targeted manner at a low coil temperature. The coil temperature determined in this way is also utilized within the scope of a diagnostic function as a redundant variable for another temperature sensor of the transmission.

The determination means can also be configured for incorporating a current supply voltage of the electromagnet 13a in the determination of its operating condition. The supply voltage is normally essentially constant. Changes of the supply voltage then do not need to be additionally taken into account in the determination of the operating condition of the electromagnet 13a. In many cases, the supply voltage can fluctuate, however. It is then advantageous to take this into account in the determination of the operating condition of the electromagnet 13a.

Figure 5:
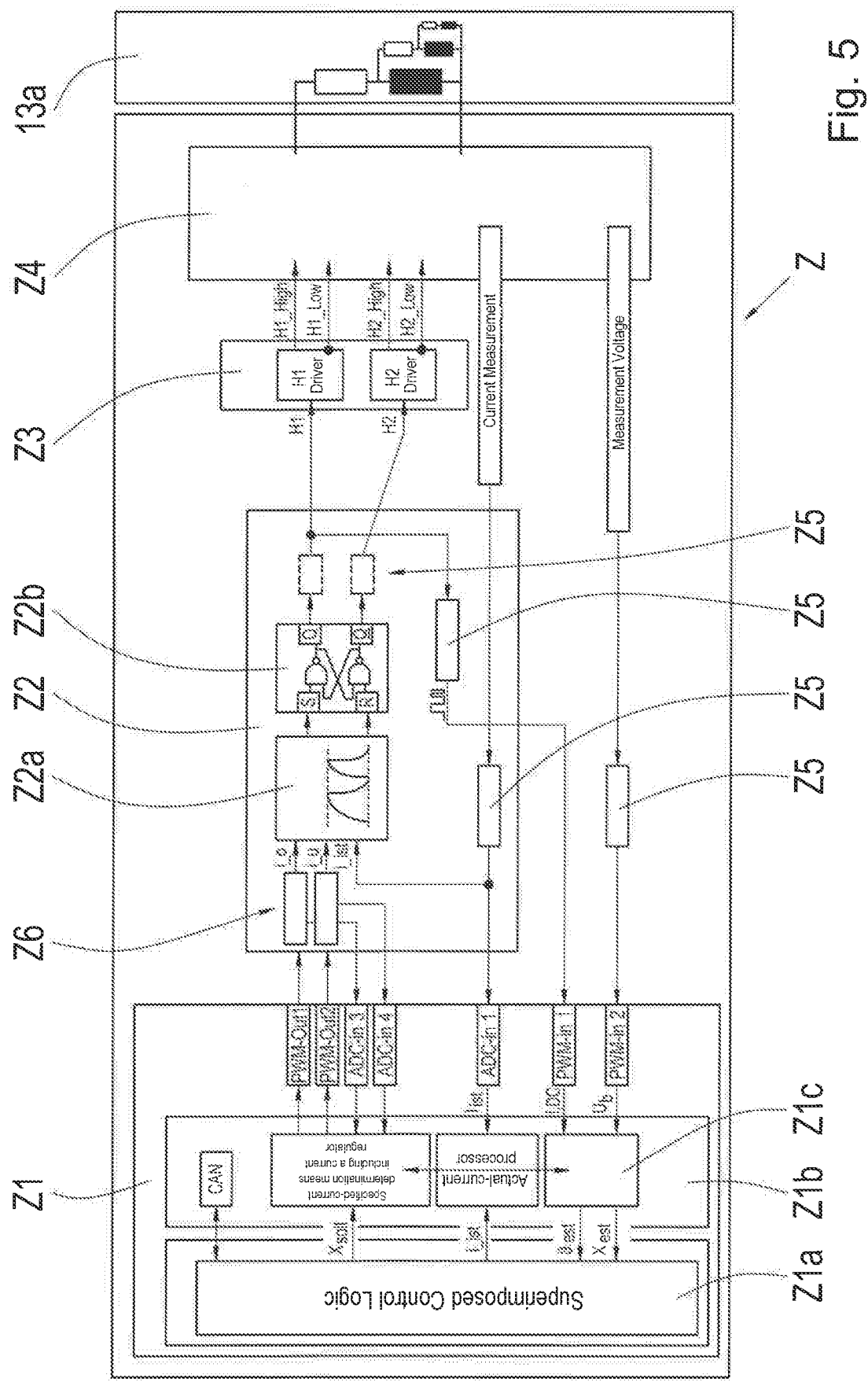
FIG. 5 shows a schematic view of a system for operating the electromagnet of the detent device of the actuator of a parking lock according to the invention, which generates the signal curve according to FIG. 4.

FIG. 5 shows a practical example of such a system for operating the electromagnet 13a within the scope of the parking lock according to the invention. This system, which is marked as Z in FIG. 5, includes a microcontroller Z1, an analog two-position controller Z2, and a bridge driver Z3. Moreover, a bridge circuit Z4 is provided, which is utilized for electrically energizing the electromagnet 13a. The electromagnet 13a is represented in FIG. 5 as a theoretical electrotechnical circuit diagram consisting of a network of ohmic resistors and inductors. The aforementioned elements Z1, Z2, Z3, Z4 of the system Z include appropriate electrical inputs and outputs, each of which is represented in FIG. 5 and is marked in an essentially self-explanatory manner.

The microcontroller Z1 includes two modules Z1a, Z1b, by way of example. Both modules Z1a, Z1b are, for example, software modules or hardware modules.

Module Z1a contains, in this case, superimposed control logic, i.e., for example, control functions, such as functional software, in particular. Module Z1b contains a specified-current determination means which includes a current regulator, an actual-current processor, and a determination means Z1c provided for determining the operating condition of the electromagnet 13a. Module Z1b therefore contains, for example, basic functions, such as basic software, in particular.

The electric current underlying the specified-current determination means, the current regulator, and the actual-current processor is the current that is supplied to the electromagnet 13a via the bridge circuit Z4. With the aid of the specified-current determination means including the current regulator, a required electric specified current for the electromagnet 13a is determined. With the aid of the actual-current processor, the electric current i_ist currently supplied to the electromagnet 13a is conditioned for processing in the microcontroller Z1 and is made available to the specified-current determination means including the current regulator, and to the determination means Z1c.

The specified-current determination means including the current regulator transmits appropriate control signals, which are marked in FIG. 5 as "PWM-Out 1", "PWM-Out 2", to the analog two-position controller Z2. The two-position controller Z2 consists of a comparator circuit Z2a and an RS flip flop (=reset/set flip flop) Z2b. In this case, the two-position controller Z2 is a discrete hardware circuit. Alternatively, provided the sampling rate is sufficiently high, the two-position controller Z2 can also be a software module which is then preferably an integral part of the microcontroller Z1.

The two-position controller Z2 allows the actuator current to toggle, i.e., fluctuate, between defined current limits with the aid of the comparator circuit Z2a and the RS flip flop Z2b. These current limits, specifically a lower current limit i_u and an upper current limit i_o, are specified by the microcontroller Z1. The actual current i_ist presently introduced into the electromagnet 13a is compared with the predefined current limits i_u, i_o in the two-position controller Z2. The present actual current i_ist is supplied to the two-position controller Z2 for this purpose. If the upper current limit i_o is exceeded, the electromagnet 13a is de-energized. If the lower current limit i_u is fallen below, the electromagnet 13a is energized. The signal for the switch-on of the energization of the electromagnet 13a is output as a control signal H1 by the two-position controller Z2 to the bridge driver Z3 and the signal for the switch-off of the energization of the electromagnet 13a is correspondingly output as a control signal H2. Due to the specification of the current limits i_u, i_o, a current regulator and an overload shutoff are therefore simultaneously implemented.

The bridge driver Z3 operates the bridge circuit Z4. With the aid of this bridge circuit Z4, the electromagnet 13a is electrically energized in accordance with the control signals H1, H2. In this case, the electromagnet 13a is intermittently energized (=current on) and intermittently de-energized (=current off) by cyclically applying a supply voltage. In this case, the bridge circuit Z4 is an H-bridge circuit, by way of example. The bridge driver Z3 therefore includes one bridge arm for each driver. These drivers are marked in FIG. 5 as "H1 driver" and "H2 driver".

In addition, means are provided in the area of the bridge circuit Z4, with the aid of which the present actual current i_ist of the electromagnet 13a as well as the supply voltage currently applied at the electromagnet 13a are measured or, alternatively, determined. In FIG. 5, these means are referred to as "current measurement" and "measurement voltage". The present current i_ist is supplied, inter alia, to the two-position controller Z2—specifically the comparator circuit Z2a—so that the current is held within the current band hys defined by the specified current limits i_u, i_o, as described above. In the case of such a specified current band hys, characteristic dynamics of the current increase and the current decrease result, as represented in FIG. 4. Such a current increase and current decrease is also indicated in FIG. 5 within the block of the comparator circuit Z2a.

The information regarding the operating condition of the electromagnet 13a, in particular, its armature position pos and its coil temperature, is implicitly contained in these dynamics, as explained above. These dynamics are also reflected in the control signals H1, H2 of the two-position controller Z2 due to the special control characteristics of the two-position controller Z2. The dynamics can therefore be extracted from the frequency and the switch-on time of the control signals H1, H2. At least one of the control signals H1, H2 is therefore supplied to the microcontroller Z1 via a capture input; in FIG. 5, this is the control signal H1. This capture input is marked in FIG. 5 as "PWM-In 1". The tap for the control signal H1 is located, by way of example, at the respective output of the RS flip flop Z2b. The control signal H1 is supplied to the determination means Z1c via the capture input of the microcontroller Z1. In addition, the supply voltage which is currently applied is supplied to the determination means Z1c via a further input of the microcontroller Z1 (marked in FIG. 5 as "ADC-In 2"). As explained above, the determination means Z1c also receives the electric current i_ist, which is currently supplied to the electromagnet 13a, from the actual-current processor of the module Z1b.

In order to determine the operating condition of the electromagnet 13a on the basis of the incoming information/signals, the determination means Z1c includes at least a lookup table, a characteristic map, or another function, and is configured for determining at least the current armature position pos of the electromagnet 13a and, on the basis thereof, inferring the current engagement position of the detection device 13 of the parking lock actuator 10. These types of lookup tables and characteristic maps are determined in advance, for example, empirically or on the basis of model calculations and then stored in the functional software of the microcontroller Z1 of the system Z. Examples of such characteristic maps are apparent in FIG. 6 and FIG. 7.

Figure 6:
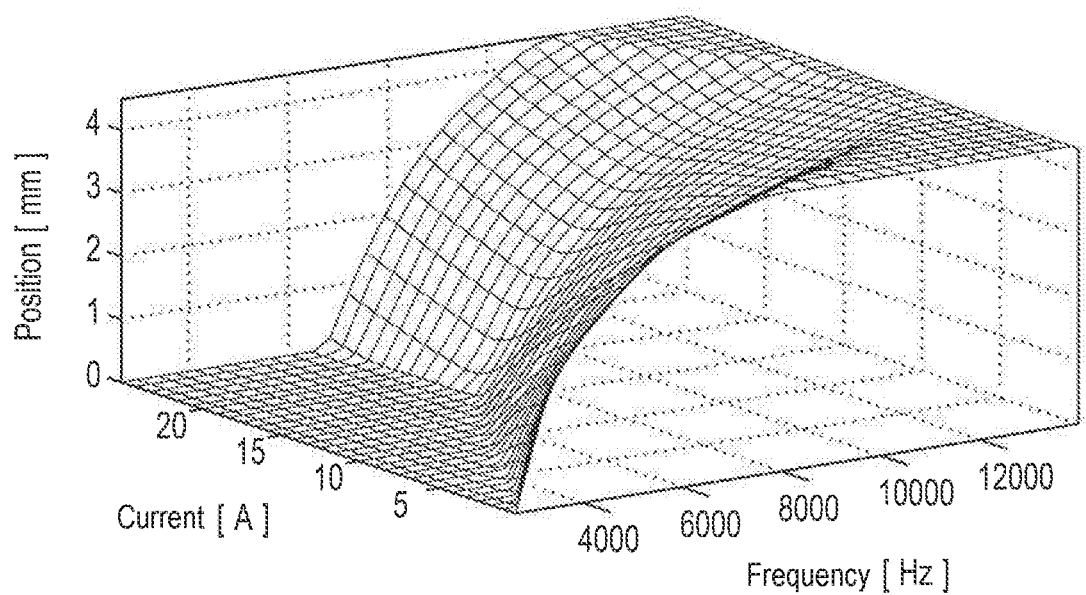
FIG. 6 shows a characteristic map for determining an armature position of the electromagnet by utilizing the system according to FIG. 5.

FIG. 6 shows a characteristic map, with the aid of which the determination means Z1c determines the actually present armature position ("Position, mm") of the electromagnet 13a on the basis of the current ("Current, A") and the frequency of the control signal H1 ("Frequency, Hz") which are applied to the coil 13c of the electromagnet 13a. In this way, precisely one armature position is uniquely associated with each value pair consisting of current and frequency.

Figure 7:
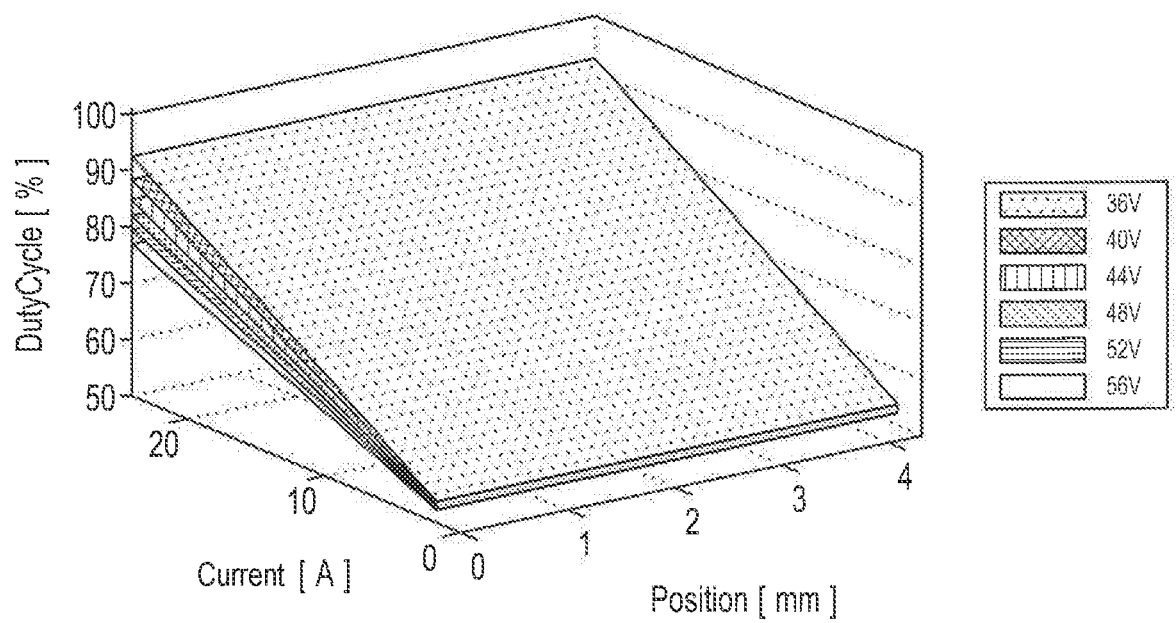
FIG. 7 shows a further characteristic map within the scope of the utilization of the system according to FIG. 5.

As indicated above, different associations of current, frequency, and armature position result at different supply voltages with which the system Z is operated. If this supply voltage fluctuates during the operation of the electromagnet 13a, it is therefore necessary to provide multiple such characteristic maps for different supply voltages or different supply voltage ranges. An example thereof is shown in FIG. 7: FIG. 7 shows multiple characteristic maps for different supply voltages (between 36V and 56V), with the aid of which the determination means Z1c determines the armature position ("Position, mm") of the electromagnet 13a on the basis of the current ("Current, A") and the switch-on time of the control signal H1 ("DutyCycle, %"). In this way, precisely one armature position is uniquely associated with each value pair consisting of current and switch-on time at a supply voltage between 36V and 56V. The uppermost characteristic map in FIG. 7 is the characteristic map for the supply voltage in the range of 36V, while the lowermost characteristic map in FIG. 7 is the characteristic map for the supply voltage in the range of 56V.

Corresponding characteristic maps are provided, alternatively or additionally, for the coil temperature which results, in particular, from the switch-on time and the supply voltage. Such a characteristic map then illustrates the unique correlation between the coil temperature and the switch-on time.

In the exemplary system Z according to FIG. 5, optional filters Z5 are provided in addition to the explicitly described or mentioned components. Likewise, the elements 16 illustrated in FIG. 5 are each an optional signal processor for the two-position controller Z2.

Finally, reference is made once again to the exemplary character of the system Z explained with reference to FIGS. 5 to 7 for operating the electromagnet 13a with the aid of the detent device 13 of the parking lock actuator 10. Modifications of this system are conceivable, of course, which lead to the same goal, namely the determination of the actual engagement position of the detent device 13 controlled by the electromagnet 13a on the basis of the actual position of the armature 13b of the electromagnet 13a, which has been determined without the utilization of a separate sensor and only via observation and evaluation of the inductance actually present at the electromagnet 13a. Thus, the provided system can have, for example, any of the following modifications or advantages, in addition to those mentioned above.

In one embodiment, the hardware logic (analog two-position controller) is implemented in software, provided the sampling rate is high (FPGA, DSP, fast µC).

In another embodiment, the specification of the upper current limit i_o and the lower current limit i_u is variable, for example, in order to bring the working frequency into targeted, advantageous ranges and/or to hold them constant therein.

In a further embodiment, due to the specification of the current limits i_o, i_u, a robust current regulator is simultaneously implemented. Except in the case of very rapid movements of the armature 13b of the electromagnet 13a usually occurring, at most, intermittently, due to the structurally delimited armature stroke, the current i_ist flowing through the coil 13c of the electromagnet 13a controlled by the system Z always lies within the tolerance band hys specified by the current limits i_o, i_u.

In another embodiment, when the analog two-position controller Z2 is utilized, an overload shutoff is also simultaneously implemented.

In an additional embodiment, the electromagnet 13a is optimized with respect to its sensitivity in order to be able to more precisely determine its operating condition.

In some embodiments, the determined operating conditions of the electromagnet 13a are compared, for the purpose of diagnosis, with expected operating conditions or intervals of tolerable operating conditions, in particular, in order to monitor the electromagnet 13a with respect to malfunctions and wear.

Moreover, in one embodiment, the determined temperature of the coil 13c of the electromagnet 13a is utilized for shutting off the electromagnet 13a even before overheating occurs. In addition, the electrical power introduced into the coil 13c is successively reduced in a timely manner before the overheating takes place, and so a continued—although limited—operation of the electromagnet 13a is made possible.

Modifications and variations can be made to the embodiments illustrated or described herein without departing from the scope and spirit of the invention as set forth in the appended claims.

REFERENCE CHARACTERS 1 parking interlock gear
1a tooth space of the locking toothing of the parking interlock gear
2 locking pawl
2a ratchet tooth of the locking pawl
3 latch bolt
3a latch bolt longitudinal axis; locking pawl pivot axis; selector-lever axis of rotation
4 selector lever
4a engaging piece of the selector lever
4b leg of the selector lever
4c mounting section on the selector lever
5 connecting rod
5a joint of the connecting rod
6 interlocking element; locking cone
7 spring element
8 guiding plate
9 inserting spring, compression spring
10 actuator
11 first piston of the actuator
11a piston rod of the first piston
12 second piston of the actuator
12a piston rod of the second piston
12b pin
12c piston longitudinal axis
13 detent device of the actuator
13a electromagnet of the detent device
13b armature of the electromagnet
13c coil of the electromagnet
14 control housing of the actuator
14a pressure chamber of the actuator
14b pressure connection of the pressure chamber
15 emergency release device
16 outer lever of the emergency release device
17 inner lever of the emergency release device
18 bolt of the emergency release device
19 leg spring of the emergency release device
P_aus disengaged condition of the parking lock
P_aus_not disengaged condition of the parking lock after actuation of the emergency release device
P_ein engaged condition of the parking lock
EGS electronic control unit
EL electrical lead
PSG signal transmitter element of a position sensor
PSN signal receiver element of a position sensor
i current
i_m mean current value
i_o upper current limit
i_u lower current limit hys current band; hysteresis
pos position of the armature of the electromagnet
t time
x, x1, x2 travel
Z system
Z1 microcontroller of the two-position controller
Z1a, Z1b module of the microcontroller
Z1c determination means
Z2 analog two-position controller
Z2a comparator circuit
Z2b RS flip flop
Z3 bridge driver
Z4 bridge circuit
Z5 filter
Z6 signal processor
H1, H2 control signal, output by the two-position controller

The invention claimed is:

1. A parking lock for a transmission of a motor vehicle, comprising:
 a parking interlock gear (1) fixed to a transmission shaft of the transmission, the parking interlock gear (1) comprising a locking toothing including tooth spaces (1a);
 a locking pawl (2) pivotably mounted on a latch bolt (3), the locking pawl (2) comprising a ratchet tooth (2a) which engages into one of the tooth spaces (1a) of the locking toothing of the parking interlock gear (1) in an engaged position (P_ein) of the parking lock to block the parking interlock gear (1) and the transmission shaft against rotation;
 a connecting rod (5) movable to change a current engagement position (P_ein, P_aus) of the parking lock, the connecting rod (5) comprising an interlocking element (6) axially displaceable on the connecting rod (5), the interlocking element (6) being spring-mounted against a parking lock disengagement direction relative to the connecting rod (5), the interlocking element (6) bringing the ratchet tooth (2a) of the locking pawl (2) into engagement with the one of the tooth spaces (1a) of the locking toothing of the parking interlock gear (1) during the engagement of the parking lock, the interlocking element (6) preventing the ratchet tooth (2a) of the locking pawl (2) from disengaging the one of the tooth spaces (1a) of the locking toothing of the parking interlock gear (1) in the engaged position (P_ein) of the parking lock;
 an inserting spring (9) providing a spring force acting in a parking lock engagement direction on an end of the connecting rod (5) spaced from the interlocking element (6);
 a hydraulically actuatable actuator (10) providing a compressive force acting in the parking lock disengagement direction on the end of the connecting rod (5) spaced from the interlocking element (6), the hydraulically actuatable actuator (10) comprising a first piston (11) axially displaceably arranged in an actuator housing (14) and pressurized to disengage the parking lock;
 a position sensor for determining the current engagement position (P_ein, P_aus) of the parking lock;
 a detent device (13) actuatable by an electromagnet (13a), the first piston (11) of the hydraulically actuatable actuator (10) being mechanically fixable by the detent device (13) in either a latched piston position associated with the engaged position (P_ein) of the parking lock or in an unlatched piston position associated with a disengaged position (P_aus) of the parking lock; and
 a system (Z) implemented in an electronic control unit (EGS) of the transmission, the system (Z) configured for determining a current engagement position of the detent device (13) by assessing a present inductance at the electromagnet (13a).

2. The parking lock of claim 1,
 wherein the system (Z) comprises a two-position controller (Z2) for controlling the electromagnet (13a) with a control signal (H1), and
 wherein the system (Z) comprises a determination means (Z1c) for determining a time profile of the control signal (H1) and for determining the current engagement position of the detent device (13) based on the time profile.

3. The parking lock of claim 2,
 wherein the determination means (Z1c) determines a frequency or period of the control signal (H1) and an electric current (i_ist) supplied to a coil (13c) of the electromagnet (13a),
 wherein the determination means (Z1c) determines a current position of an armature (13b) of the electromagnet (13a) based on the frequency or period and the electric current (i_ist), and
 wherein the determination means (Z1c) infers the current engagement position of the detent device (13) based on the current position of the armature (13b) of the electromagnet (13a).

4. The parking lock of claim 3, wherein the determination means (Z1c) utilizes an electrical supply voltage of the coil (13c) of the electromagnet (13a) to determine the current position of the armature (13b) of the electromagnet (13a).

5. The parking lock of claim 3, wherein the determination means (Z1c) comprises a look-up table or a characteristic map or another mathematical function for determining with the control signal (H1) the current position of the armature (13b) of the electromagnet (13a).

6. The parking lock of claim 1, wherein the detent device (13) mechanically fixes the first piston (11) of the actuator (10) in the latched or unlatched piston position when the electromagnet (13a) acting on the detent device (13) is not electrically energized, such that the first piston (11) only changes between the latched and unlatched piston positions when the electromagnet (13a) is electrically energized.

7. The parking lock of claim 1, wherein the detent device (13) mechanically fixes the first piston (11) of the actuator (10) in the latched or unlatched piston position when the electromagnet (13a) acting on the detent device (13) is electrically energized, such that the first piston (11) only changes between the latched and unlatched piston positions when the electromagnet (13a) is not electrically energized.

8. The parking lock of claim 1, wherein a piston rod (11a) of the first piston (11) of the actuator (10) is articulatedly connected to the end of the connecting rod (5) spaced from the interlocking element (6).

9. The parking lock of claim 8, further comprising an emergency release device which is mechanically brought into an operative connection with the piston rod (11a) of the first piston (11) of the actuator (10) to manually disengage the parking lock.

10. The parking lock of claim 1, further comprising a selector lever (4) for transmitting the compressive force of the actuator (10) to the end of the connecting rod (5) spaced from the interlocking element (6), the selector lever (4) being rotatable about a selector-lever axis of rotation (3a) to specify the current engagement position (P_ein, P_aus) of the parking lock, wherein the end of the connecting rod (5) spaced from the interlocking element (6) is articulatedly connected to the selector lever (4), and wherein the position sensor is an inductive or capacitive sensor, a signal transmitter element (PSG) of the position sensor being arranged on the selector lever (4).

11. The parking lock of claim 10, wherein the signal transmitter element (PSG) of the position sensor is attached to the selector lever (4) or is an integral element of the selector lever.

12. The parking lock of claim 10, further comprising:

an emergency release device (15) which is mechanically brought into an operative connection with the selector lever (4) to manually disengage the parking lock, a second piston (12) of the actuator (10), the first and second pistons (11, 12) of the actuator (10) being axially displaceably arranged on a common longitudinal axis (12*c*) in the actuator housing (14), wherein the second piston (12) is axially displaced against the spring force of the inserting spring (9) when the first piston (11) is hydraulically pressurized, wherein the second piston (12) is mechanically connected to the selector lever (4) such that axial movement of the second piston (12) causes rotation of the selector lever (4) about the selector-lever axis of rotation (3*a*), and vice versa, wherein the detent device (13) is also arranged in the actuator housing (14), wherein the detent device (13) mechanically fixes the first piston (11) either in the latched or unlatched piston position when the electromagnet (13*a*) acting on the detent device (13) is not electrically energized, and wherein the detent device (13) releases the first piston (11) from the latched or unlatched piston position when the electromagnet (13*a*) acting on the detent device (13) is electrically energized, and wherein the second piston (12) is axially displaceable by the selector lever (4) without the first piston (11) being released from its latched piston position by actuating the emergency release device (15).

13. The parking lock of claim 12, wherein the first piston (11) and the second piston (12) are successively arranged along the longitudinal axis (12*c*).

14. The parking lock of claim 12, wherein the inserting spring (9) is a compression spring axially tensioned between the second piston (12) and the actuator housing (14), the inserting spring (9) at least partially concentrically surrounding a piston rod (12*a*) of the second piston (12).

15. The parking lock of claim 12, wherein, upon actuation of the emergency release device (15), an inner lever (17) of the emergency release device (15) mechanically acts on the selector lever (4), the inner lever (17) being arranged within a transmission housing of the transmission and connected in a torsion-proof manner via a bolt (18) extending through a housing wall of the transmission housing to a manually actuatable outer lever (16) arranged outside the transmission housing.

16. The parking lock of claim 12, wherein the selector lever (4) is displaceably mounted on the latch bolt (3) such that a latch bolt longitudinal axis, a locking pawl pivot axis, and the selector-lever axis of rotation (3*a*) are the same axis and extend at a right angle to the piston longitudinal axis (12*c*) of the second piston (12) of the actuator (10).

17. The parking lock of claim 16, wherein the connecting rod (5) is articulatedly attached to the selector lever (4) and is arranged below the locking pawl (2) such that a plane of movement of the connecting rod (5) is essentially parallel to a plane of movement of the locking pawl (2), the selector lever (4), and the piston rod (12*a*).

18. The parking lock of claim 17, further comprising a transmission housing-affixed guiding device against which the locking device (6) rests against a normal force of the locking pawl (2) during the engagement and disengagement of the parking lock, wherein the transmission housing-affixed guiding device is a guiding plate (8) or a guide sleeve, and wherein the guiding device is attached to the actuator housing (14) or is an integral component of the actuator housing.

* * * * *